US012648031B2

(12) United States Patent
Lee et al.

(10) Patent No.: US 12,648,031 B2
(45) Date of Patent: Jun. 2, 2026

(54) METHOD AND DEVICE FOR SUPPORTING DIRECT COMMUNICATION SERVICE IN WIRELESS COMMUNICATION SYSTEM

(71) Applicant: SAMSUNG ELECTRONICS CO., LTD., Suwon-si (KR)

(72) Inventors: Hoyeon Lee, Suwon-si (KR); Sunghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 451 days.

(21) Appl. No.: 17/758,393

(22) PCT Filed: Jan. 6, 2021

(86) PCT No.: PCT/KR2021/000144
§ 371 (c)(1),
(2) Date: Jul. 5, 2022

(87) PCT Pub. No.: WO2021/141385
PCT Pub. Date: Jul. 15, 2021

(65) Prior Publication Data
US 2023/0022840 A1 Jan. 26, 2023

(30) Foreign Application Priority Data
Jan. 6, 2020 (KR) ........................ 10-2020-0001616

(51) Int. Cl.
*H04W 76/14* (2018.01)
*H04L 5/00* (2006.01)
(52) U.S. Cl.
CPC ........... *H04W 76/14* (2018.02); *H04L 5/0053* (2013.01)

(58) Field of Classification Search
CPC ..... H04W 76/14; H04W 12/50; H04W 12/69; H04W 4/40; H04W 92/18; H04W 76/11; H04W 76/23; H04W 4/70; H04L 5/0053
See application file for complete search history.

(56) References Cited

U.S. PATENT DOCUMENTS 11,184,748 B2 11/2021 Lee et al.
2020/0145798 A1 5/2020 Kim et al.
(Continued)

FOREIGN PATENT DOCUMENTS

CN 110536262 A 12/2019
EP 3 965 440 A1 3/2022
(Continued)

OTHER PUBLICATIONS

International Search Report and Written Opinion of the International Searching Authority in connection with International Application No. PCT/KR2021/000144 issued Apr. 5, 2021, 10 pages.
(Continued)

*Primary Examiner* — Vinncelas Louis

(57) ABSTRACT

A method of a first terminal in a wireless communication system includes establishing a unicast link with a second terminal; determining to change a first old identifier of the first terminal related to the unicast link to a first new identifier of the first terminal; transmitting, to the second terminal, a link identifier (ID) update request message including the first new identifier by using the first old identifier and a second old identifier of the second terminal; in response to the link ID update request message, receiving, from the second terminal, a link ID update accept message including a second new identifier of the second terminal changed from the second old identifier and the first new identifier by using the first old identifier and the second old identifier; and transmitting, to the second terminal, a link ID (Continued)

update acknowledgement message including the second new identifier.

7 Claims, 9 Drawing Sheets

(56)                    References Cited

U.S. PATENT DOCUMENTS

| | | | |
|---|---|---|---|
| 2020/0329513 A1* | 10/2020 | Pan ....................... | H04W 76/11 |
| 2021/0127362 A1 | 4/2021 | Jin et al. | |
| 2021/0211870 A1* | 7/2021 | Perras ..................... | H04W 4/70 |
| 2022/0217575 A1 | 7/2022 | Wang et al. | |
| 2022/0377524 A1* | 11/2022 | Ferdi ..................... | H04W 76/14 |

FOREIGN PATENT DOCUMENTS

| | | |
|---|---|---|
| KR | 10-2019-0131549 A | 11/2019 |
| KR | 10-2020-0114863 A | 10/2020 |
| WO | 2019199140 A1 | 10/2019 |
| WO | 2019/245783 A1 | 12/2019 |

OTHER PUBLICATIONS

3GPP TR 33.836 V0.5.0 (Nov. 2019) Technical Report; 3rd Generation Partnership Project; Technical Specification Group Services and System Aspects; Study on Security Aspects of 3GPP support for Advanced V2X Services (Release 16); 50 pages.

Vivo, "TS 23.287 Clarification on the Link identifier update," S2-1907107, 3GPP TSG SA WG2 #134, Sapporo, Japan, Jun. 24-28, 2019, 4 pages.

OPPO, "Discussion on network involvement in unicast link management," R2-1908729, 3GPP TSG RAN WG2 #107, Prague, Czech, Aug. 26-30, 2019, 8 pages.

Interdigital Inc., Solution #11 Update with Distinct Layer-2 ID per Communication Link, S2-1812879, 3GPP TSG SA WG2 #129b, West Palm Beach, FL, USA, Nov. 26-30, 2019, 3 pages.

Supplementary European Search Report dated Jan. 2, 2023 in connection with European Patent Application No. 21 73 8508, 9 pages.

Office Action dated Jul. 5, 2025, in connection with Chinese Application No. 202180008417.0, 14 pages.

Office Action dated Aug. 13, 2025, in connection with Korean Application No. 10-2020-0001616, 8 pages.

* cited by examiner

METHOD AND DEVICE FOR SUPPORTING DIRECT COMMUNICATION SERVICE IN WIRELESS COMMUNICATION SYSTEM

CROSS-REFERENCE TO RELATED APPLICATIONS

This application is a 371 of International Application No. PCT/KR2021/000144, filed Jan. 6, 2021, which claims priority to Korean Patent Application No. 10-2020-0001616 filed Jan. 6, 2020, the disclosures of which are herein incorporated by reference in their entirety.

BACKGROUND

1. Field

The disclosure relates to a wireless communication system and, more particularly, to a method and an apparatus for supporting a direct communication service in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the development of a communication system, a security problem in the communication system has become more important.

SUMMARY

The disclosure provides a direct communication method for solving a security problem in a wireless communication system.

According to an embodiment of the disclosure to solve the above-described problem, a method of a first terminal in a wireless communication system includes: establishing a unicast link with a second terminal; determining to change a first old identifier of the first terminal related to the unicast link to a first new identifier of the first terminal; transmitting, to the second terminal, a link identifier (ID) update request message including the first new identifier by using the first old identifier and a second old identifier of the second terminal; in response to the link ID update request message, receiving, from the second terminal, a link ID update accept message including a second new identifier of the second terminal changed from the second old identifier and the first new identifier by using the first old identifier and the second old identifier; and transmitting, to the second terminal, a link ID update acknowledgement message including the second new identifier.

According to another embodiment of the disclosure, a method of a second terminal in a wireless communication system includes: establishing a unicast link with a first terminal; receiving, from the first terminal, a link identifier (ID) update request message including a first new identifier of the first terminal changed from a first old identifier of the first terminal related to the unicast link by using the first old identifier and a second old identifier of the second terminal; in response to the link ID update request message, transmitting, to the first terminal, a link ID update accept message including a second new identifier of the second terminal changed from the second old identifier and the first new identifier by using the first old identifier and the second old identifier; and receiving, from the first terminal, a link ID update acknowledgement message including the second new identifier.

According to another embodiment of the disclosure, a first terminal in a wireless communication system includes a transceiver and a controller configured to: establish a unicast link with a second terminal, determine to change a first old identifier of the first terminal related to the unicast link to a first new identifier of the first terminal, transmit, to the second terminal via the transceiver, a link identifier (ID) update request message including the first new identifier by using the first old identifier and a second old identifier of the second terminal, in response to the link ID update request message, receive, from the second terminal via the transceiver, a link ID update accept message including a second new identifier of the second terminal changed from the second old identifier and the first new identifier by using the first old identifier and the second old identifier, and transmit, to the second terminal via the transceiver, a link ID update acknowledgement message including the second new identifier.

According to another embodiment of the disclosure, a second terminal in a wireless communication system includes a transceiver and a controller configured to: establish a unicast link with a first terminal, receive, from the first terminal via the transceiver, a link identifier (ID) update request message including a first new identifier of the first terminal changed from a first old identifier of the first terminal related to the unicast link by using the first old identifier and a second old identifier of the second terminal, in response to the link ID update request message, transmit, to the first terminal via the transceiver, a link ID update accept message including a second new identifier of the second terminal changed from the second old identifier and the first new identifier by using the first old identifier and the second old identifier in response to the link ID update request message, and receive, from the first terminal via the transceiver, a link ID update acknowledgement message including the second new identifier.

According to the disclosure, it is possible to provide a direct communication service having enhanced security in a wireless communication system.

DETAILED DESCRIPTION

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 5G, new radio (NR), and long term evolution (LTE) system standards for the convenience of description. However, the disclosure is not limited by these terms and names, and may be applied in the same way to systems that conform other standards.

The following detailed description of embodiments of the disclosure will be mainly directed to the communication standards defined by 3GPP. However, based on determinations by those skilled in the art, the main idea of the disclosure may also be applied to other communication systems having similar technical backgrounds through some modifications without significantly departing from the scope of the disclosure.

Also, the following detailed description of embodiments of the disclosure will be mainly directed to vehicle communication services. However, based on determinations by those skilled in the art, the main idea of the disclosure may also be applied to other services provided in 5G networks through some modifications without significantly departing from the scope of the disclosure.

Figure 1:
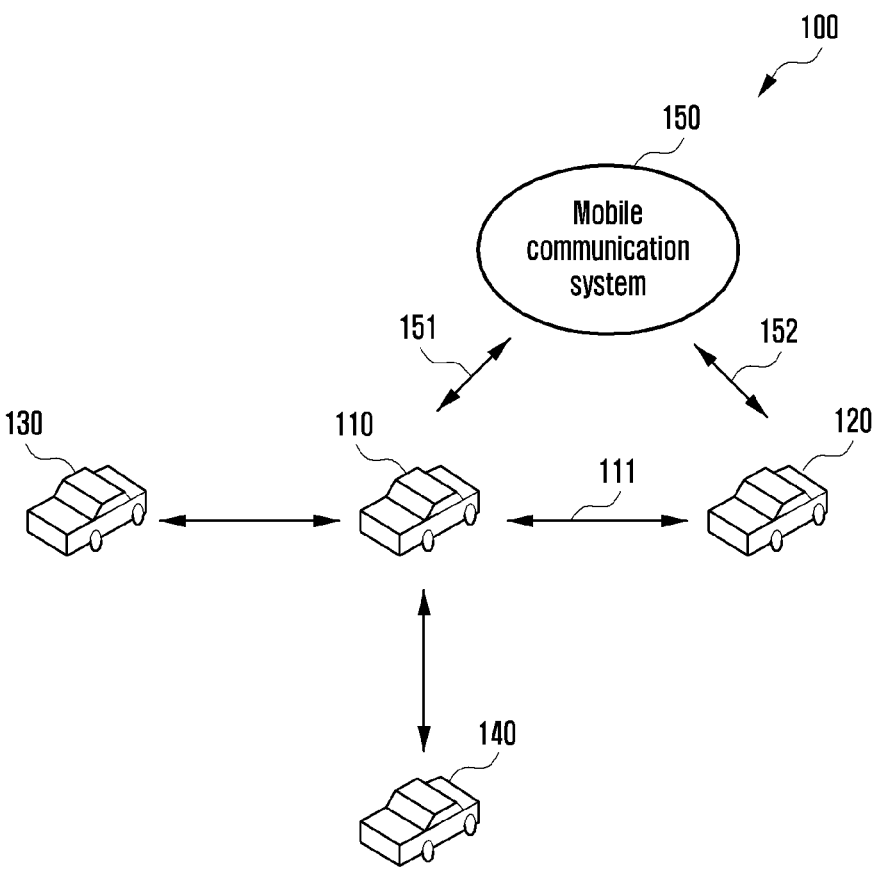
FIG. 1 illustrates the configuration of a wireless communication system according to an embodiment of the disclosure.

FIG. 1 illustrates the configuration of a wireless communication system according to an embodiment of the disclosure.

Referring to FIG. 1, the wireless communication system may include a vehicle communication system 100. The vehicle communication system 100 may include a plurality of electronic devices 110 to 140 and a mobile communication system 150.

The electronic devices 110 to 140 may be referred to as user equipments, terminals, vehicle UEs, or the like. The electronic devices 110 to 140 may be devices capable of performing wireless communication.

For example, the first electronic device 110 may communicate with the second electronic device 120 through a direct communication link 111. The direct communication link 111 may be referred to as a device-to-device (D2D) link, a proximity-based service (ProSe) link, a PC3 link, a sidelink, or the like. The direct communication link 111 may be provided through at least one communication technology among an LTE radio access technology (RAT), an NR RAT, or a non-3GPP RAT (for example, Wi-Fi or the like). For example, the first electronic device 110 may transmit a message to the second electronic device 120 through the PC5 link. The first electronic device 110 may receive a message from the second electronic device 120 through the PC5 link.

The first electronic device 110 may communicate with the second electronic device 120 through network communication 151 and 152 using the mobile communication system 150. The network communication 151 and 152 may include Uu links. For example, the message transmitted from the first electronic device 110 may be transmitted to the second electronic device 120 through the Uu link 152 via the mobile communication system 150 through the Uu link 151. The mobile communication system 150 may include at least one communication system among an evolved packet core (EPC) system or a 5G core (5GC) defined in the 3GPP, and communication system other than the 3GPP.

Figure 2:
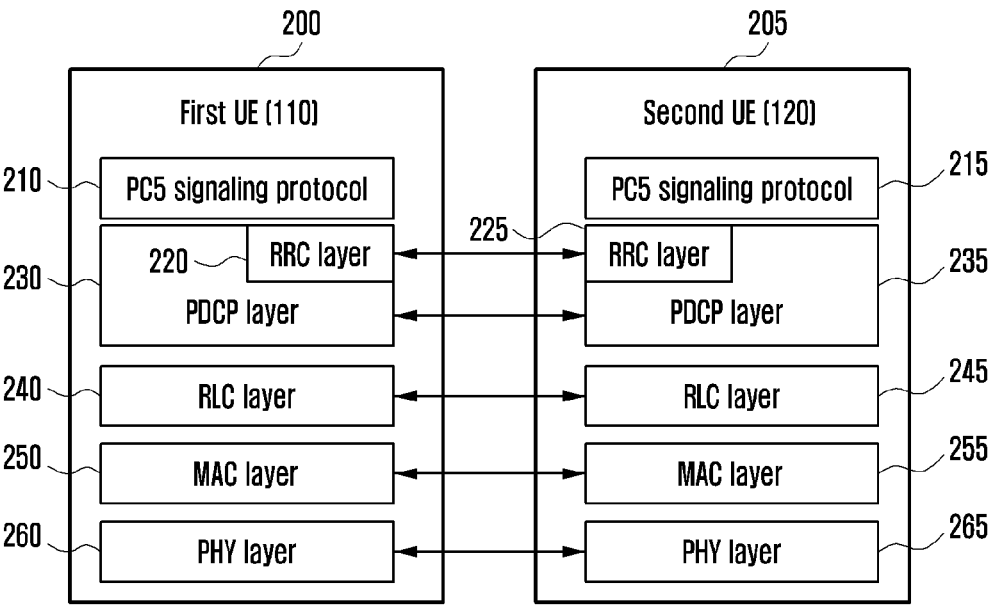
FIG. 2 is a conceptual diagram illustrating a control plane protocol stack of the UE according to an embodiment of the disclosure.

FIG. 2 is a conceptual diagram illustrating a control plane protocol stack of the UE according to an embodiment of the disclosure.

Referring to FIG. 2, a control plane protocol stack 200 of a first UE 110 may include a PC5 signaling protocol layer 210, a radio resource control (RRC) layer 220, a packet data convergence protocol (PDCP) layer 230, a radio link control (RLC) layer 240, a medium access control (MAC) layer 250, and a physical (PHY) layer 260. The RRC layer 220, the PDCP layer 230, the RLC layer 240, and the MAC layer 250 may be referred to as an access stratum layer.

A control plane protocol stack 205 of a second UE 120 may include a PC5 signaling protocol layer 215, an RRC layer 225, a PDCP layer 235, an RLC layer 245, an MAC layer 255, and a PHY layer 265. The RRC layer 225, the PDCP layer 235, the RLC layer 245, and the MAC layer 255 may be referred to as an AS layer.

The PC5 signaling protocol layers 210 and 215 may provide a link establishment and link maintenance function for a direct communication link 111 between the first UE 110 and the second UE 120.

Figure 3:
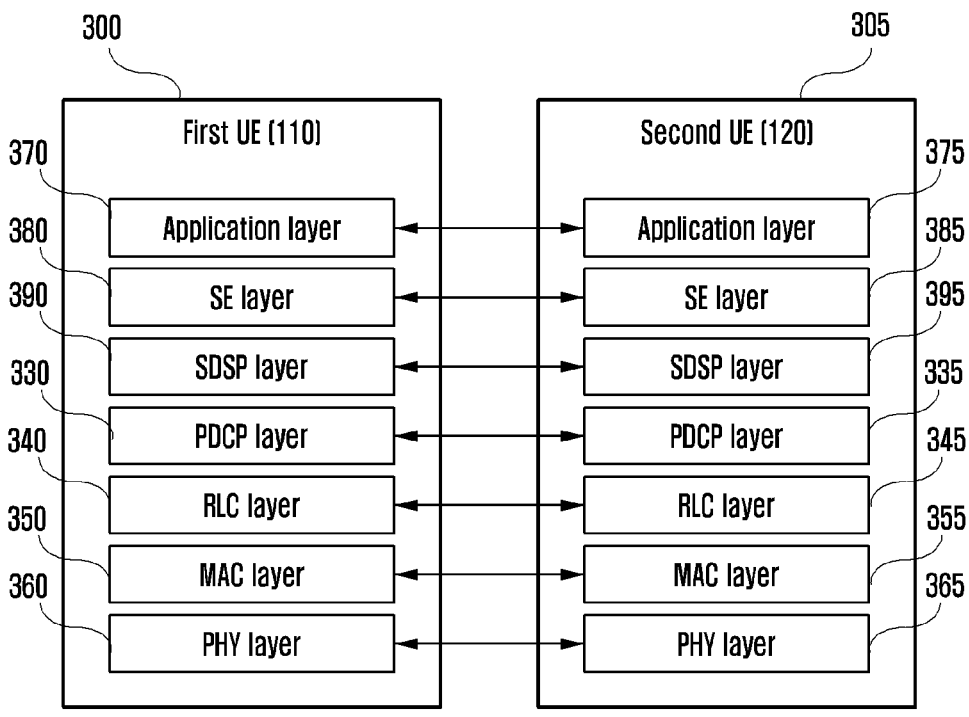
FIG. 3 is a conceptual diagram illustrating a user plane protocol stack of the UE according to an embodiment of the disclosure.

FIG. 3 is a conceptual diagram illustrating a user plane protocol stack of the UE according to an embodiment of the disclosure.

Referring to FIG. 3, a user plane protocol stack 300 of the first UE 110 may include an application 370, a service enabling (SE) layer 380, a service data adaptation protocol (SDAP) layer 390, a PDCP layer 330, and an RLC layer 340, an MAC layer 350, and a PHY layer 360. The SDAP layer 390, the PDCP layer 330, the RLC layer 340, and the MAC layer 350 may be referred to as an AS layer.

A user plane protocol stack 305 of the second UE 120 may include an application layer 375, an SE layer 385, an SDAP layer 395, a PDCP layer 335, an RLC layer 345, an MAC layer 355, and a PHY layer 365. The SDAP layer 395, the PDCP layer 335, the RLC layer 345, and the MAC layer 355 may be referred to as an AS layer.

The SE layer 380 may be an intermediate layer for supporting an operation of the application layer 370. For example, the SE layer 380 may provide a function specialized in each application or each service. One SE layer 380 may support a plurality of application layers. Further, an SE layer specialized in each application layer may be defined. For example, when the application layer 370 is a layer for providing a V2X service, the application layer 370 may be referred to a V2X application layer. Further, the SE layer 280 for supporting the operation of the V2X application layer may be referred to as a V2X layer.

The SE layer 380 may provide a function for transmitting and receiving data through the link 111 configured for direct communication between the first UE 110 and the second UE 120. For example, the SE layer 380 may include an IP protocol for message transmission, a non-IP protocol, and a transport protocol. The transport protocol may be a transfer control protocol (TCP) or a user datagram protocol (UDP).

After direct communication link establishment is completed between the first UE 110 and the second UE 120, the SDAP layer 90 may be used when data is transmitted and received through the direct communication link 111. For example, when PC5 link establishment is completed between the first UE 110 and the second UE 120, the SDAP layer 390 may be used when data is transmitted and received through the completely established PC5 link. For example, the PC5 link may be used for PC5 unicast communication or PC5 groupcast communication.

The SDAP layer 390 may be used even when data is transmitted and received without establishment of the direct communication link 111 between the first UE 110 and the second UE 120. For example, the SDAP layer 390 may be used for PC5 groupcast communication or PC5 broadcast communication.

The PC5 signaling protocol layer 210 according to an embodiment of the disclosure may include a function provided by the SE layer 380. Alternatively, the PC5 signaling protocol layer 210 may interact with the SE layer 380 to perform link establishment and link management.

A function of each layer of the user plane protocol stack 305 of the second UE 120 may the same as or similar to a function of each layer of the user plane protocol stack 300 of the first UE 110.

First Embodiment

The first UE 110 may perform a procedure for establishing a direct communication link for one-to-one direct communication with the second UE 120. For example, the first UE 110 may transmit and receive various messages to and from the second UE 120 after the procedure for establishing the direct communication link or direct communication link establishment. For example, various messages may be messages requiring security such as integrity protection, confidentiality protection, trackability attack prevention, linkability attack prevention, and the like.

An operation for security establishment (or security association establishment) in the procedure of establishing the link for direct communication between the first UE 110 and the second UE 120 is described with reference to FIGS. 4 and 5 below.

Figure 4:
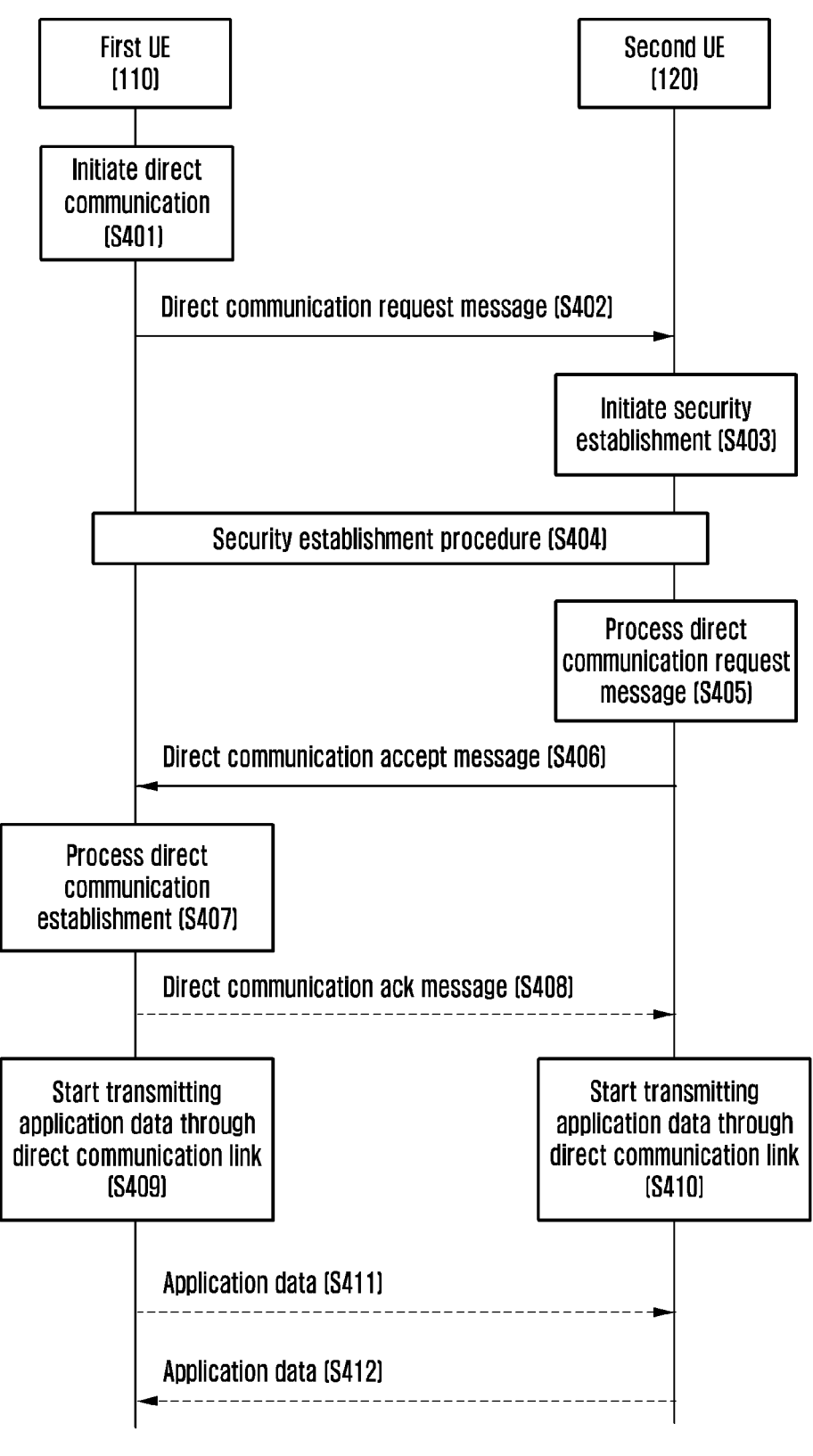
FIG. 4 is a flowchart illustrating a procedure of establishing a direct communication link (ProSe link establishment) according to an embodiment of the disclosure.

FIG. 4 is a flowchart illustrating a procedure of establishing a direct communication link (ProSe link establishment) according to an embodiment of the disclosure.

Referring to FIG. 4, the first UE 110 may initiate direct communication in S401. The first UE 110 may generate a direct communication request message in order to initiate direct communication.

The first UE 110 may use a layer-2 ID of the first UE 110 as a source layer-2 ID of the direct communication request message.

The first UE 110 may store the layer-2 ID of the second UE 120 which is a target of direct communication. At this time, the first UE 110 may use the layer-2 ID of the second UE 120 as a destination layer-2 ID of the direct communication request message.

The first UE 110 may not pre-store a peer UE which is a target of direct communication. Alternatively, the first UE 110 may not pre-store the layer-2 ID of the second UE 120 which is a target of direct communication. At this time, the first UE 110 may use a default layer-2 ID preconfigured in the first UE 110 as the destination layer-2 ID of the direct communication request message.

The first UE 110 may transmit the generated direct communication request message to the second UE 120 in S402.

When the destination layer-2 ID of the direct communication request message is the layer-2 ID of the second UE 110, the direct communication request message may be transmitted to the second UE 120 in a unicast communication scheme.

When the destination layer-2 ID of the direct communication request message is the default layer-2 ID, the direct communication request message may be transmitted to the second UE 120 in a broadcast or groupcast communication scheme.

The second UE 120 may receive the direct communication request message from the first UE 110. The second UE 120 may determine establishment of the direct communication link with the first UE 110 on the basis of the direct communication request message. The second UE 120 may initiate security establishment on the basis of the direct communication request message in S403. The second UE 120 may perform a security establishment procedure in S404. The security establishment procedure is described in detail with reference to FIG. 5.

The second UE 120 may process the direct communication request message in S405. For example, the second UE 120 may store information received from the first UE 110 in S401 to S404.

The second UE 120 may generate a direct communication accept message in response to the direct communication request message received from the first UE 110.

The second UE 120 may use the layer-2 ID of the second UE 120 as a source layer-2 ID of the direct communication accept message.

The second UE 120 may use the layer-2 ID of the first UE 110 as a destination layer-2 ID of the direct communication accept message. The layer-2 ID of the first UE 110 may be the source layer-2 ID of the direct communication request message.

The second UE 120 may transmit the direct communication accept message to the first UE 110 in S406. The direct communication accept message may be transmitted in a unicast communication scheme.

The first UE 110 may process direct communication establishment in S407. For example, the first UE 110 may store information received from the second UE 120 in S404 to S406.

The first UE 110 may transmit a direct communication acknowledgement message indicating reception of the direct communication accept message to the second UE 120 in S408. Transmission of the direct communication accept message may be omitted.

After receiving the direct communication accept message or after transmitting the direct communication acknowledgement message, the first UE 110 may start application data transmission using the direct communication link in S409. After transmitting the direct communication accept message or after receiving the direct communication acknowledgement message, the second UE 120 may start application data transmission using the direct communication link in S410.

The first UE 110 may transmit application data to the second UE 120 through the direct communication link in S411. The data transmitted through the direct communication link may be protected by security established in S404.

For example, the AS layer of the first UE 110 may determine security context for transmitting the application data on the basis of an indicator indicating the direct communication link or an indicator indicating security context used for the direct communication link. For example, the PDCP layers 230 and 330 of the first UE 110 may determine security context for transmitting application data on the basis of a PC5 link ID indicating the direct communication link or a Kd session ID indicating security context used for the direct communication link.

Further, the AS layer may insert the Kd session ID into a PDCP header for transmitting application data. For example, the PDCP layers 230 and 330 may insert the Kd session ID into the PDCP header for transmitting application data.

The second UE 120 may receive the application data from the first UE 110. The AS layer of the second UE 120 may determine security context for processing the received application data on the basis of the Kd session ID inserted into the PDCP header. For example, the PDCP layers 235 and 335 may determine security context for processing the received application data on the basis of the Kd session ID inserted into the PDCP header of the received data.

The second UE 120 may transmit the application data to the first UE 110 through the direct communication link in S412. The data transmitted through the direct communication link may be protected by security established in S404.

The AS layer of the second UE 120 may determine security context for transmitting the application data on the basis of an indicator indicating the direct communication link or an indicator indicating security context used for the direct communication link. For example, the PDCP layers 235 and 335 of the second UE 120 may determine security context for transmitting application data on the basis of a PC5 link ID indicating the direct communication link or a Kd session ID indicating security context used for the direct communication link.

The AS layer may insert the Kd session ID into a PDCP header for transmitting application data. For example, the PDCP layers 235 and 335 may insert the Kd session ID into the PDCP header for transmitting application data.

The first UE 100 may receive the application data from the second UE 120. The AS layer of the first UE 110 may determine security context for processing the received application data on the basis of the Kd session ID inserted into the PDCP header. For example, the PDCP layers 230 and 330 of the first UE 110 may determine security context for processing the received application data on the basis of the Kd session ID inserted into the PDCP header of the received data.

Figure 5:
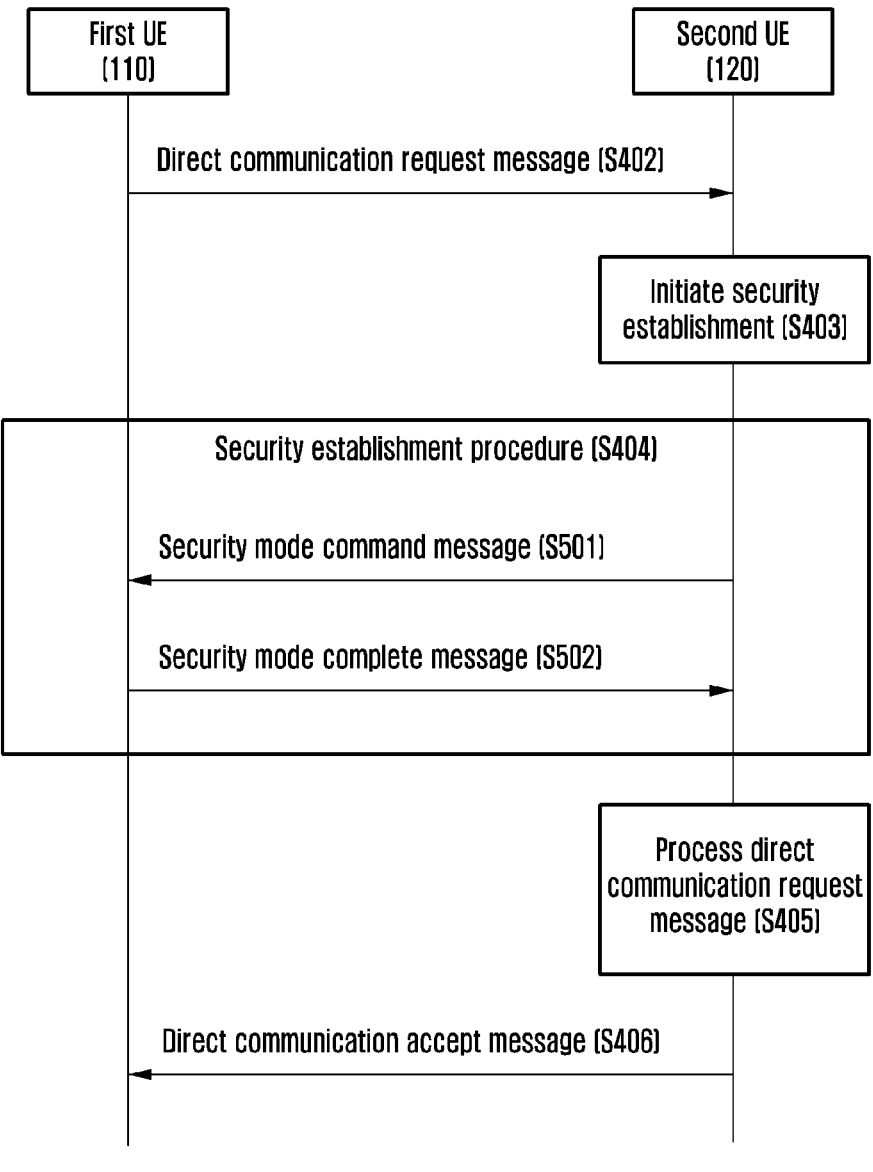
FIG. 5 is a flowchart illustrating a security establishment procedure in the procedure of establishing the direct communication link (ProSe link establishment) in a wireless communication system according to an embodiment of the disclosure.

FIG. 5 is a flowchart illustrating a security establishment procedure in the procedure of establishing the direct communication link (ProSe link establishment) in a wireless communication system according to an embodiment of the disclosure.

Referring to FIG. 5, the first UE 110 may transmit the direct communication request message to the second UE 120 in S402. The second UE 120 may receive the direct communication request message from the first UE 110. The second UE 120 may determine establishment of the direct communication link with the first UE 110 on the basis of the direct communication request message. The second UE 120 may initiate the security establishment procedure in S403.

The security establishment procedure S404 may include an operation S501 of transmitting and receiving a security mode command message and an operation S502 of transmitting and receiving a security mode complete message.

The second UE 120 may transmit the security mode command message to the first UE 110 in S501. The first UE 110 may receive the security mode command message from the second UE 120. The security mode command message may include information for security establishment.

The first UE 110 may transmit the security mode complete message to the second UE 120 in S502. The second UE 120 may receive the security mode complete message from the first UE 110. The security mode complete message may include information for security establishment.

The second UE 120 may process the direct communication request message in S405.

The second UE 120 may transmit the direct communication accept message to the first UE 110 in S406. The first UE 110 may receive the direct communication accept message from the second UE 120.

The first UE 110 and the second UE 120 may generate a security association identifier indicating security context for the direct communication link by exchanging security-related information. The security association identifier may be referred to as a Kd session ID. The security association identifier may be generated using various methods below.

For example, the first UE 110 may determine a value to be used as a most significant byte (MSB) of the Kd session ID. For example, the first UE 110 may transmit the direct communication request message including the MSB of the Kd session ID to the second UE 120. The second UE 120 may determine a value to be used as a least significant byte (LSB) of the Kd session ID. For example, the second UE 120 may transmit the security mode command message including the LSB of the Kd session ID to the first UE 110. Further, the second UE 120 may transmit the security mode command message including the MSB of the Kd session ID in order to inform of reception of the MSB of the Kd session ID from the first UE 110. The first UE 110 may transmit the security mode complete message including the LSB of the Kd session ID to the second UE 120 in order to inform of reception of the LSB of the Kd session ID from the second UE 120.

The first UE 110 may generate the Kd session ID on the basis of the MSB determined by the first UE 110 and the LSB received from the second UE 120. The second UE 120 may generate the Kd session ID on the basis of the MSB received from the first UE 110 and the LSB determined by the second UE 120. Through the above-described method, the first UE 110 and the second UE 120 may generate the same Kd session ID value as the security association identifier of the direct communication link.

The second UE 120 according to another embodiment of the disclosure may determine a value to be used as the most significant byte (MSB) of the Kd session ID. For example, the second UE 120 may transmit the security mode command message including the MSB of the Kd session ID to the first UE 110. The first UE 110 may determine a value to be used as the least significant byte (LSB) of the Kd session ID. For example, the first UE 110 may transmit the security mode complete message including the LSB of the Kd session ID to the second UE 120. Further, the first UE 110 may transmit the security mode complete message including the MSB of the Kd session ID to the second UE 120 in order to inform of reception of the MSB of the Kd session ID from the second UE 120. The second UE 120 may transmit the direct communication accept message including the LSB of the Kd session ID to the first UE 110 in order to inform of reception of the LSB of the Kd session ID from the first UE 110.

The first UE 110 may generate the Kd session ID on the basis of the MSB received from the second UE 120 and the LSB determined by the first UE 110. The second UE 120 may generate the Kd session ID on the basis of the MSB determined by the second UE 120 and the LSB received from the first UE 110. Through the above-described method, the first UE 110 and the second UE 120 may generate the same Kd session ID value as the security association identifier of the direct communication link.

After receiving the security mode command message or after receiving the direct communication accept message, the V2X layer of the first UE 110 according to an embodiment of the disclosure may transmit the PC5 link ID indicating the direct communication link and relevant security information to the AS layer of the first UE 110. For example, the relevant security information may be the Kd session ID.

The AS layer of the first UE 110 may store the PC5 link ID and the relevant security information received from the V2X layer. For example, the AS layer of the first UE 110 may configure a protocol header of the AS layer in order to transmit application data through the direct communication link. At this time, the AS layer of the first UE 110 may configure the stored PC5 link KD and relevant Kd session ID to be inserted into the protocol header of the AS layer.

The second UE 120 may determine security context related to the direct communication link on the basis of the Kd session ID included in the protocol header of the AS layer (for example, PDCP header) of the application data received from the first UE 110 and the Kd session ID received from the V2X layer of the second UE 120.

After receiving the direct communication request message, receiving the security mode complete message, or transmitting the direct communication accept message, the V2X layer of the second UE 120 according to an embodiment of the disclosure may transmit the PC5 link ID indicating the direct communication link and the relevant security information (for example, Kd session ID) to the AS layer of the second UE 120.

The AS layer of the second UE 120 may store the PC5 link ID and the relevant security information (for example, Kd session ID) received from the V2X layer of the second UE 120. For example, the AS layer of the second UE 120 may configure a protocol header of the AS layer in order to transmit application data through the direct communication link. For example, the AS layer of the second UE 120 may configure the protocol header (for example, PDCP header) of the AS layer to include the stored PC5 link KD and relevant Kd session ID.

The first UE 110 may determine security context related to the direct communication link on the basis of the Kd session ID included in the protocol header (for example, PDCP header) of the AS layer of the application data received from the second UE 120 and the Kd session ID received from the V2X layer of the first UE 110.

Second Embodiment

The first UE 110 and the second UE 120 according to an embodiment of the disclosure may perform a procedure of establishing the direct communication link through the above described procedure and configure security establishment in order to perform one-to-one direct communication.

Figure 6:
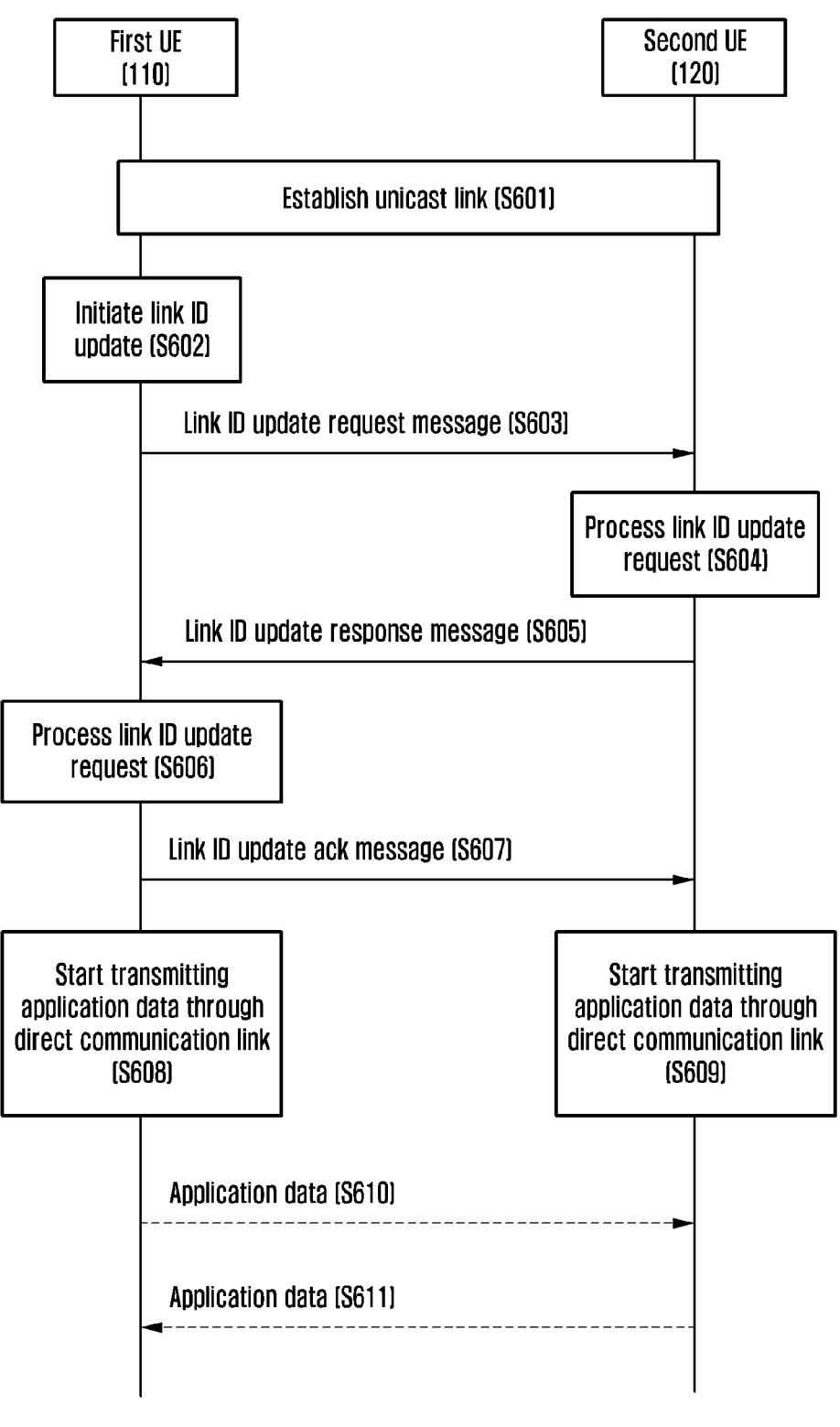
FIG. 6 is a flowchart illustrating a procedure of changing direct communication-related information in a wireless communication system according to an embodiment of the disclosure.

FIG. 6 is a flowchart illustrating a procedure of changing direct communication-related information in a wireless communication system according to an embodiment of the disclosure.

The first UE 110 and the second UE 120 according to an embodiment of the disclosure may change a layer-2 ID and security information (for example, Kd session ID or the like).

Referring to FIG. 6, the first UE 110 and the second UE 120 may establish a unicast link in S601. For example, an operation of establishing the unicast link may correspond to S402 to S406 of FIG. 4. For example, the AS layer of the second UE 120 may complete direct communication link establishment through the direct communication link establishment procedure (S402 to S406 of FIG. 4).

The first UE 110 may initiate a link ID update in S602. For example, the first UE 110 may determine to change information related to the established direct communication link. For example, the first UE 110 may determine to change the layer-2 ID of the first UE 110 and security information (for example, Kd session ID) used in the direct communication link. For example, the layer-2 ID used in the direct communication link may be referred to as a first layer-2 ID. The Kd session ID used in the direct communication link may be referred to as a first Kd session ID. The layer-2 ID updated in the direct communication link may be referred to as a second layer-2 ID. The Kd session ID updated in the direct communication link may be referred to as a second Kd session ID. For example, the first UE 110 may determine the second layer-2 ID and an MSB of the second Kd session ID updated in the direct communication link.

The first UE 110 may generate a link identifier (ID) update request.

The first UE 110 may use the first layer-2 ID of the first UE 110 as a source layer-2 ID of the link ID update request message. The first UE 110 may use the first layer-2 ID of the second UE 120 as a destination layer-2 ID of the link ID update request message. The use of a source layer-2 ID and a destination layer-2 ID of a specific message in the disclosure may mean that, for example, the source layer-2 ID and the destination layer-2 ID are included in the header of the message.

The first UE 110 may insert the first Kd session ID into the PDCP header as the Kd session ID.

The first UE 110 may generate a link ID update request message including at least one of the second layer-2 ID of the first UE 110 determined by the first UE 110 and the MSB of the second Kd session ID determined by the first UE 110.

The first UE 110 may transmit the link ID update request message to the second UE 120 in S603.

The link ID update request message may be protected by security established through the procedure of FIG. 4 or 5.

The second UE 120 may process the link ID update request message in S604. For example, the second UE 120 may determine to change the layer-2 ID and security information (for example, Kd session ID) used in the direct communication link established with the first UE 110. For example, the second UE 120 may determine the second layer-2 ID and an LSB of the second Kd session ID updated in the direct communication link.

The second UE 120 may store the second layer-2 ID of the first UE 110 and the MSB of the second Kd session ID received from the first UE 110.

The second UE 120 may generate a link identifier (ID) update response message in response to the link ID update request message. Meanwhile, in the disclosure, for example, the ID update response message may be referred to as a link ID update accept (link identifier accept response) message generated and transmitted in response to the link ID update request message.

The second UE 120 may use the first layer-2 ID of the second UE 120 as a source layer-2 ID of the link ID update response message.

The second UE 120 may use the first layer-2 ID of the first UE 110 as a destination layer-2 ID of the link ID update response message.

The second UE 120 may set the PDCP header to include the first Kd session ID as the Kd session ID.

The second UE 120 may generate a link ID update response message including at least one of the second layer-2 ID of the second UE 120 determined by the second UE 120, the LSB of the second Kd session ID determined by the second UE 120, the second layer-2 ID of the first UE 110 received from the first UE 110, and the MSB of the second Kd session ID from the first UE 110.

The second UE 120 may transmit the link ID update response message to the first UE 110 in S605. The link ID update response message may be protected by security established through the procedure of FIG. 4 or 5.

The first UE 110 may process the link ID update response message in S606. For example, the first UE 110 may store the link ID update response message received from the second UE 120. For example, the first UE 110 may store the second layer-2 ID of the second UE 120 and the LSB of the second Kd session ID.

The first UE 110 may generate a link identifier update acknowledgement (Ack) message indicating reception of the link ID update response message. The link identifier update ack message may include at least one of the second layer-2 ID of the second UE 120 and the LSB of the second Kd session ID received from the second UE 120.

The first UE 110 may transmit the link ID update ack message to the second UE 120 in S607. The link ID update ack message may be protected by security established through the procedure of FIG. 4 or 5.

The first UE 110 may start transmitting application data through the direct communication link in S608. For example, after transmitting the link ID update ack message, the first UE 110 may transmit the application data to the second UE 120 by using updated information related to the direct communication link. The second UE 120 may start transmitting the application data through the direct communication link in S609. For example, after receiving the link ID update ack message, the second UE 120 may transmit the application data to the first UE 110 by using the updated information related to the direct communication link. The first UE 110 may transmit the application data to the second UE 120 through the direct communication link in S610.

The first UE 110 may use the second layer-2 ID of the first UE 110 as a source layer-2 ID of the application data.

The first UE 110 may use the second layer-2 ID of the second UE 120 as a destination layer-2 ID of the application data.

The first UE 110 may set a PDCP header to include the second Kd session ID as the Kd session ID.

The application data may be protected by security established through the procedure of FIG. 4 or 5.

The second UE 120 may transmit the application data to the first UE 110 through the direct communication link in S611.

The second UE 120 may use the second layer-2 ID of the second UE 120 as the source layer-2 ID of the application data.

The second UE 120 may use the second layer-2 ID of the first UE 110 as the destination layer-2 ID of the application data.

The second UE 120 may set the PDCP header to include the second Kd session ID as the Kd session ID.

The application data may be protected by security established through the procedure of FIG. 4 or 5.

After receiving the link ID update response message or after transmitting the link ID update ack message, the V2X layer of the first UE 110 according to an embodiment of the disclosure may transmit the PC5 link ID indicating the direct communication link and relevant updated security information (for example, second Kd session ID) to the AS layer of the first UE 110.

The AS layer of the first UE 110 may store the PC5 link ID and the relevant updated security information (for example, second Kd session ID) received from the V2X layer of the first UE 110. For example, the AS layer of the first UE 110 may set a protocol header of the AS layer in order to transmit application data through the direct communication link. For example, the AS layer may set the protocol header (for example, PDCP header) of the AS layer to include the stored PC5 link ID and the associated second Kd session ID.

The second UE 120 may determine security context related to the direct communication link on the basis of the second Kd session ID included in the protocol header of the AS layer (for example, PDCP header) of the application data received from the first UE 110 and the second Kd session ID received from the V2X layer of the second UE 120.

After receiving the link ID update request message, or after transmitting the link ID update response message, or after receiving the link ID update ack message, the V2X layer of the second UE 120 according to an embodiment of the disclosure may transmit the PC5 link ID indicating the direct communication link and relevant updated security information (for example, second Kd session ID) to the AS layer of the second UE 120.

The AS layer of the second UE 120 may store the PC5 link ID and the relevant updated security information (for example, second Kd session ID) received from the V2X layer of the second UE 120. For example, the AS layer of the second UE 120 may set a protocol header of the AS layer in order to transmit application data through the direct communication link. The AS layer may set the protocol header (for example, PDCP header) of the AS layer to include the stored PC5 link ID and relevant second Kd session ID.

The first UE 110 may determine security context related to the direct communication link on the basis of the second Kd session ID included in the protocol header of the AS layer (for example, PDCP header) of the application data received from the second UE 120 and the second Kd session ID received from the V2X layer of the first UE 110.

Third Embodiment

Figure 7:
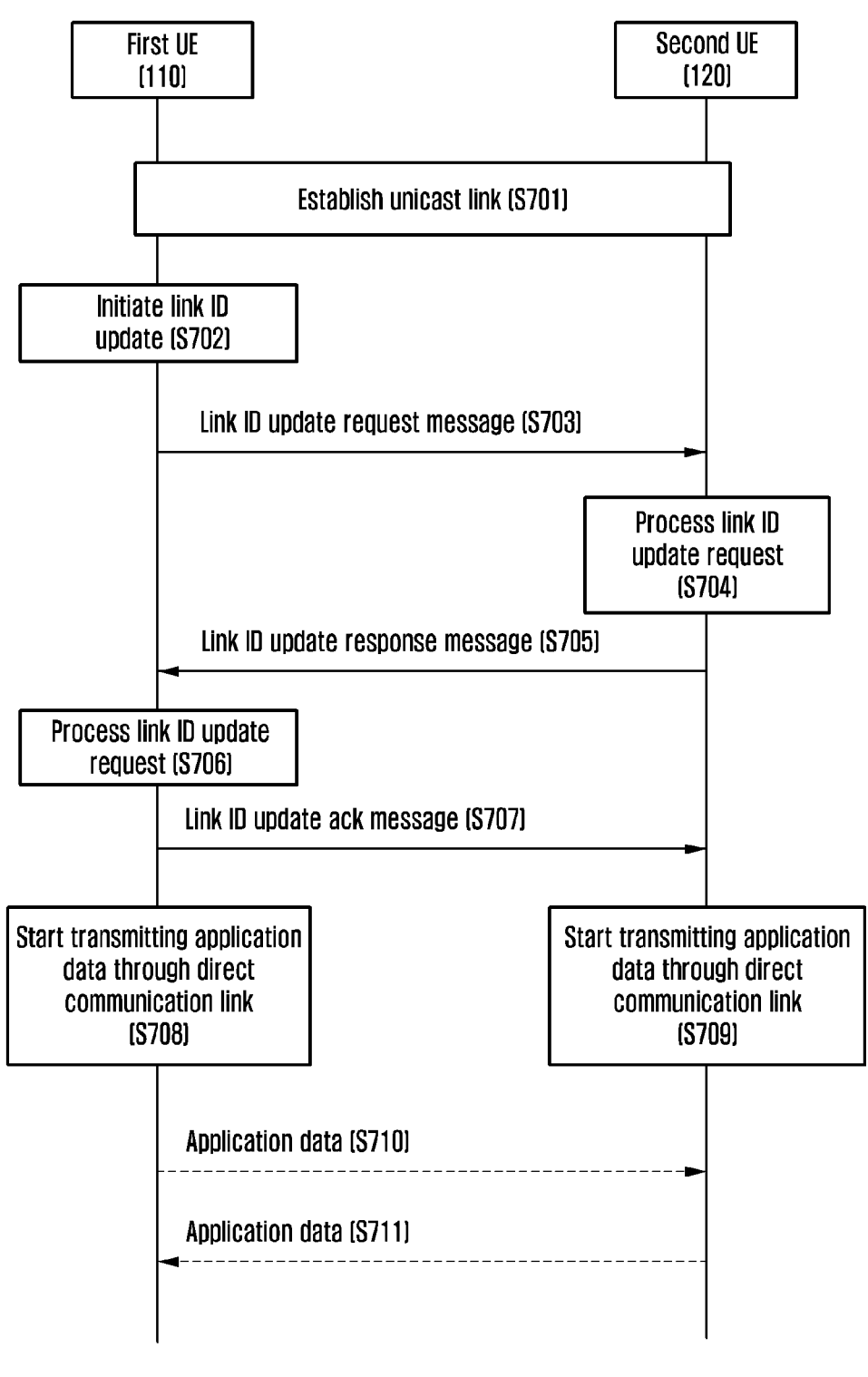
FIG. 7 is a flowchart illustrating a procedure of changing direct communication-related information in a wireless communication system according to an embodiment of the disclosure.

FIG. 7 is a flowchart illustrating a procedure of changing direct communication-related information in a wireless communication system according to an embodiment of the disclosure.

The first UE 110 and the second UE 120 according to an embodiment of the disclosure may perform a procedure of establishing the direct communication link through the procedure illustrated in FIGS. 4 and 5 and configure security establishment in order to perform one-to-one direct communication.

Further, the first UE 110 and the second UE 120 may change the configured security establishment (or security association establishment) of the direct communication link establishment procedure through a procedure which is the same as that illustrated in FIG. 6. For example, after completing the procedure which is the same as the link ID update procedure illustrated in FIG. 6, the first UE 110 and the second UE 120 according to an embodiment of the disclosure may transmit or receive application data or control plane data (for example, a PC5-S message, a PC5-RRC message, or the like) by using the updated indicator (for example, the second layer-2 ID, the second Kd session ID, or the like).

The third embodiment describes a message transmission method of the first UE 110 and the second UE 120 during or after the change in the security establishment. Specifically, a method of preventing data loss (packet loss) which can be generated by the change from the old ID (for example, the first layer-2 ID, the first Kd session Id, or the like) to the updated ID (for example, the second layer-2 ID or the second Kd session ID) is described.

The first UE 110 and the second UE 120 according to an embodiment of the disclosure may overlappingly transmit or receive the application data or the control plane data by using the old ID and the updated ID for a predetermined time. In the disclosure, overlapping reception of the data by the UE using the old ID and the updated ID may mean that, for example, the UE expects both reception of data using the old ID and reception of data using the updated ID. For example, the first UE 110 and the second UE 120 may negotiate a time for overlappingly transmitting and receiving the data. For example, the first UE 110 may transmit a link ID update request message including time information for overlappingly transmitting or receiving data to the second UE 120 in S703. The first UE 110 may transmit a link ID update acknowledgement message including time information for overlappingly transmitting or receiving data to the second UE in S707.

The second UE 120 may transmit a link ID update response message including time information for overlappingly transmitting or receiving data to the first UE 110 in S705. The first UE 110 and the second UE 120 may overlappingly transmit or receive the data that is transmitted or received after S708 or S709 on the basis of the time information received in S703, S705, or S707.

Alternatively, for example, the first UE 110 and the second UE 120 may pre-store a time for overlappingly transmitting or receiving data as configuration (pre-configuration) information. For example, the configuration information may be configured or pre-configured. In the disclosure, the term "configured" may mean the case in which the UE is configured by the BS in a cell-common method. The term "cell-common" may mean that UEs in the cell receive a configuration of the same information from the BS. At this time, a method in which the UE receives system information from the BS and acquires cell-common information may be considered. Further, a UE-specific method may be configured after the UE establishes the RRC connection with the BS. The term "UE-specific" may be replaced with the term "UE-dedicated" and may mean that every UE receives configuration information having a specific value. At this time, a method in which the UE may receive an RRC message from the BS and acquires UE-specific information may be considered. Further, in the disclosure, the configuration may mean the case in which the UE is configured from the mobile communication system 150. In addition, in the disclosure, the pre-configured configuration information may mean configuration information pre-stored in the UE.

The first UE 110 and the second UE 120 may overlappingly transmit or receive the data that is transmitted or received after S708 or S709 for a time indicating by the pre-stored configuration information.

The first UE 110 and the second UE 120 may determine priorities of the received time information and the pre-stored configuration information. For example, the first UE 110 and the second UE 120 may give a higher priority to the received time information to operate among the received time information and the pre-stored configuration information. When there is no received time information, the first UE 110 and the second UE 120 may apply the pre-stored configuration information to operate.

Alternatively, for example, the first UE 110 and the second UE 120 may overlappingly transmit or receive data transmitted after S708 or S709 until a specific message is received. For example, the first UE 110 may overlappingly transmit or receive data until data in S711 is received from the second UE 120. The data in S711 may be transmitted using the updated ID (for example, the second layer-2 ID, the second Kd session ID, or the like). The second UE 120 may overlappingly transmit or receive data until data in S710 is received from the first UE 110. The message in S707 may be transmitted using the old ID (for example, the first layer-2 ID, the first Kd session ID, or the like).

Alternatively, for example, the first UE 110 may overlappingly transmit or receive data until the result of message transmission in S707 (for example, information indicating transmission success or failure) is received from the AS layer of the first UE 110. The AS layer of the first UE 110 may determine the result of message transmission in S707 on the basis of feedback for message transmission (for example, HARQ feedback, ACK/NACK, or the like) in S707 received from the second UE 120 and inform the higher layer (for example, V2X layer) of the first UE 110 of the result.

Alternatively, for example, the first UE 110 may transmit or receive data using the old ID (for example, the first layer-2 ID, the first Kd session ID, or the like) until the result for message transmission (for example, information indicating transmission success or failure) in S707 is received from the AS layer of the first UE 110. Further, after receiving success of the message transmission in S707 from the AS layer of the first UE 110, the first UE 110 may transmit or receive data using the updated ID (for example, the second layer-2 ID, the second KD session ID, or the like).

The first UE 110 and the second UE 120 according to an embodiment of the disclosure may determine loss of the transmitted message illustrated in FIG. 7 and retransmit the message.

For example, when the data in S711 received after transmission of the link ID update ack message in S707 is data transmitted using the old ID (for example, the first layer-2 ID, the first Kd session ID, or the like), the first UE 110 may determine loss of the link ID update ack message transmitted in S707. The first UE 110 may retransmit the lost link ID update ack message to the second UE 120.

For example, when the link ID update ack message in S707 is not received for a predetermined time after the link ID update response message in S705 is transmitted or when the data in S710 received after the link ID update response message in S705 is received is data transmitted using the old ID (for example, the first layer-2 ID, the first Kd session ID, or the like), the second UE 120 may determine loss of the link update response message transmitted in S705. The second UE 120 may retransmit the lost link ID update response message to the first UE 110.

The first UE 110 and the second UE 120 according to an embodiment of the disclosure may overlappingly transmit or receive data in order to prevent data loss (packet loss) which can be generated according to a change from the old ID (for example, the first layer-2 ID, the first Kd session ID, or the like) used in the direct communication link to the updated ID (For example, the second layer-2 ID, the second Kd session ID, or the like). The data overlapping processing operation may be performed by the V2X layer or the AS layer. In the description of the embodiment, the first UE 110 is described as an example, but the second UE 120 can perform the same operation.

According to an embodiment of the disclosure, the V2X layer of the first UE 110 may overlappingly transmit data. For example, the V2X layer 380 of the first UE 110 may receive application data from the application layer 370. Alternatively, the V2X layer 210 of the first UE 110 may generate control plane data (for example, a PC5-S message).

The V2X layers 380 and 210 of the first UE 110 may determine to transmit the application data or the control plane data to the second UE 120.

Further, the V2X layers 380 and 210 of the first UE 110 may determine to overlappingly transmit the application data or the control plane data to the second UE 120 through various methods according to embodiments of the disclosure. That is, the V2X layers 380 and 210 of the first UE 110 may overlappingly transmit the same data by using each of the old identifier and the updated identifier.

More specifically, the V2X layers 280 and 210 of the first UE 110 may use the first layer-2 ID of the first UE 110 as a source layer-2 ID of first data. The V2X layers 280 and 210 of the first UE 110 may use the first layer-2 ID of the second UE 120 as a destination layer-2 ID of the first data. The V2X layers 280 and 210 of the first UE 110 may insert a first Kd session ID into a PDCP header of the first data as the Kd session ID.

Further, the V2X layers 280 and 210 of the first UE 110 may use the second layer-2 ID of the first UE 110 as a source layer-2 ID of second data. The V2X layers 280 and 210 of the first UE 110 may use the second layer-2 ID of the second UE 120 as a destination layer-2 ID of the second data. The V2X layers 280 and 210 of the first UE 110 may insert a second Kd session ID into a PDCP header of the second data as the Kd session ID.

Contents included in message bodies of the first data and the second data may be the same as each other. The V2X layers 280 and 210 of the first UE 110 may insert information indicating that the first data and the second data are the same data duplicated into the first data and the second data. For example, the V2X layers 280 and 210 of the first UE 110 may indicate that the first data and the second data are the same data duplicated by using information included in the AS layer header of the first data and the second data (for example, a count number included in the PDCP header). The V2X layers 280 and 210 of the first UE 110 may transmit the first data and the second data to the AS layer of the first UE 110. The AS layer of the first UE 110 may transmit the first data and the second data to the second UE 120.

According to another embodiment of the disclosure, the AS layer of the first UE 110 may overlappingly transmit data. For example, the AS layer of the first UE 110 may receive data (for example, application data or PC5-S message) from the V2X layer 210 or 380. Alternatively, the AS layer of the first UE 110 may generate control plane data (for example, PC5-RRC message).

The AS layer of the first UE 110 may determine to transmit the data received from the V2X layer 210 or 380 or the control plane data to the second UE 120.

Further, the AS layer of the first UE 110 may determine to overlappingly transmit application data or control plane data to the second UE 120 in various methods according to an embodiment of the disclosure. That is, the AS layer of the first UE 110 may determine to overlappingly transmit the same data by using each of the old ID and the updated ID.

More specifically, the AS layer of the first UE 110 may use the first layer-2 ID of the first UE 110 as a source layer-2 ID of first data. The AS layer of the first UE 110 may use the first layer-2 ID of the second UE 120 as a destination layer-2 ID. The AS layer of the first UE 110 may insert the first Kd session ID into the PDCP header as the Kd session ID.

Further, the AS layer of the first UE 110 may use the second layer-2 ID of the first UE 110 as a source layer-2 ID of second data. The AS layer of the first UE 110 may use the second layer-2 ID of the second UE 120 as a destination layer-2 ID. The AS layer of the first UE 110 may insert the second Kd session ID into the PDCP header as the Kd session ID.

Contents included in message bodies of the first data and the second data may be the same as each other. The AS layer of the first UE 110 may insert information indicating that the first data and the second data are the same data duplicated into the first data and the second data. For example, the AS layer of the first UE 110 may indicate that the first data and the second data are the same data duplicated by using information included in the AS layer header of the first data and the second data (for example, a count number included in the PDCP header). The AS layer of the first UE 110 may transmit the first data and the second data to the second UE 120.

According to an embodiment of the disclosure, the V2X layer of the first UE 110 may overlappingly receive data. For example, the V2X layers 210 and 380 of the first UE 110 may receive data from the AS layer of the first UE 110. The data transmitted from the AS layer of the first UE 110 to the V2X layers 210 and 380 may be data which the AS layer of the first UE 110 receives from the second UE 120.

The V2X layers 210 and 380 of the first UE 110 may determine that the first data and the second data are the same data duplicated on the basis of at least one of the source layer-2 IDs and the destination layer-2 IDs of the first data and the second data received from the AS layer, and information included in the AS layer header (for example, the Kd session ID and the count number included in the PDCP header). The first UE 110 may process only one piece of the first data and the second data. For example, the first UE 110 may discard the second data when receiving the second data after the first data is processed. That is, for example, the V2X layer 380 of the first UE 110 may transmit the first data to the application layer 370 and may not transmit the second data to the application layer 370.

According another embodiment of the disclosure, the AS layer of the first UE 110 may overlappingly receive data. For example, the AS layer of the first UE 110 may receive data from the second UE 120.

The AS layer of the first UE 110 may determine that the first data and the second data are the same data duplicated on the basis of at least one of the source layer-2 IDs and the destination layer-2 IDs of the first data and the second data received from the second UE 120, and information included in the AS layer header (for example, the Kd session ID and the count number included in the PDCP header). The first UE 110 may process only one piece of the first data and the second data. For example, the first UE 110 may discard the second data when receiving the second data after the first data is processed. For example, the AS layer of the first UE 110 may transmit the first data to the V2X layers 210 and 380 and may not transmit the second data to the V2X layers 210 and 380.

Figure 8:
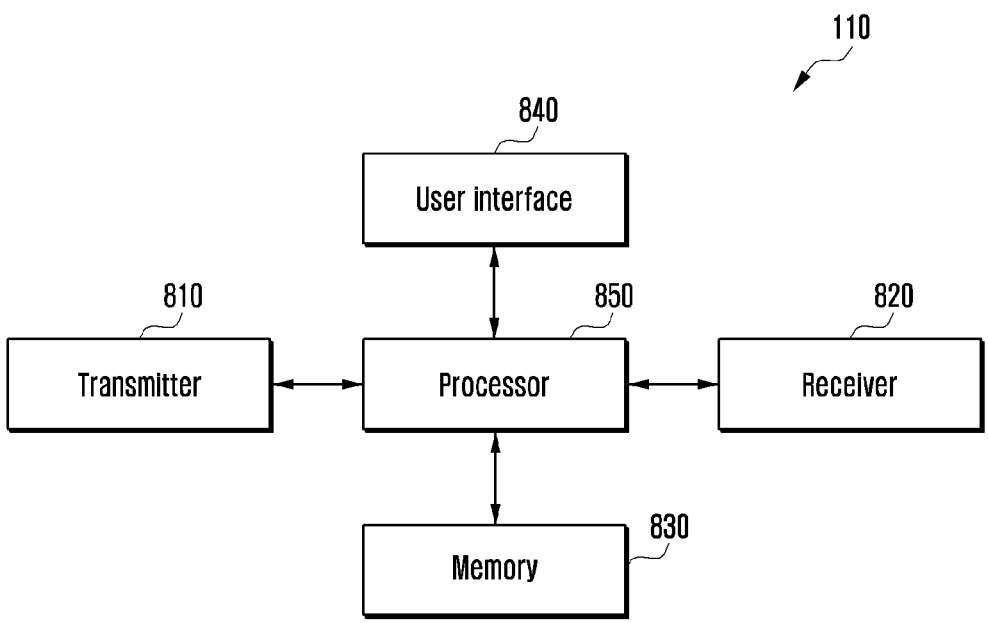
FIG. 8 is a block diagram illustrating a first UE in a wireless communication system according to an embodiment of the disclosure.

FIG. 8 is a block diagram illustrating the first UE in a wireless communication system according to an embodiment of the disclosure.

Referring to FIG. 8, the first UE 110 may include a transmitter 810, a receiver 820, a memory 830, a user interface 840, and a processor 850. The first UE 110 may additionally have more elements according to an implementation scheme. For example, various additional devices such as a display unit, an input unit, and a sensor for the user interface 840 may be further included. The disclosure does not limit such additional elements.

The transmitter 810 may transmit signals and/or messages through a radio link on the basis of the embodiments described in FIGS. 1 to 7. When the first UE 810 communicates with a 5G network, the transmitter 810 may be a device capable of performing transmission through a 5G communication network. Further, the transmitter 810 may include a communication processor as necessary.

The receiver 820 may receive signals and/or messages through a radio link on the basis of the embodiments described in FIGS. 1 to 7. When the first UE 810 communicates with a 5G network, the receiver 820 may be a device capable of performing reception through a 5G communication network. Further, the receiver 820 may include a communication processor as necessary.

When the transmitter 810 and the receiver 820 do not include the communication processor, all signals and/or messages may be processed by the processor 850.

The memory 830 may store various pieces of data required for the control of the first UE 810 on the basis of the embodiments described in FIGS. 1 to 7 and may have an area for storing the above-described messages and data.

The processor 850 may control the basic operation of the first UE 110 and may control transmission/reception, processing, and storage of messages and data on the basis of the embodiments described in FIGS. 1 to 7.

Figure 9:
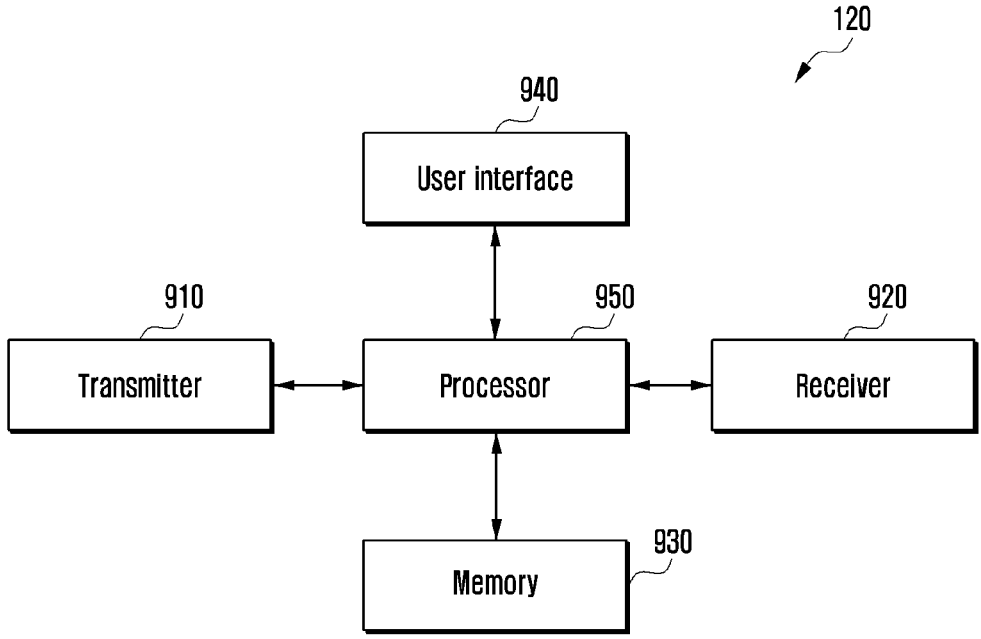
FIG. 9 is a block diagram illustrating a second UE according to an embodiment of the disclosure.

FIG. 9 is a block diagram illustrating the second UE according to an embodiment of the disclosure.

Referring to FIG. 9, the second UE 120 may include a transmitter 910, a receiver 920, a memory 930, a user interface 940, and a processor 950. The second UE 120 may additionally have more elements according to an implementation scheme. For example, various additional devices such as a display unit, an input unit, and a sensor for the user interface 940 may be further included. The disclosure does not limit such additional elements.

The transmitter 910 may transmit signals and/or messages through a radio link on the basis of the embodiments described in FIGS. 1 to 7. When the second UE 820 communicates with a 5G network, the transmitter 910 may be a device capable of performing transmission through a 5G communication network. Further, the transmitter 910 may include a communication processor as necessary.

The receiver 920 may receive signals and/or messages through a radio link on the basis of the embodiments described in FIGS. 1 to 7. When the second UE 820 communicates with a 5G network, the receiver 920 may be a device capable of performing reception through a 5G communication network. Further, the receiver 920 may include a communication processor as necessary.

When the transmitter 910 and the receiver 920 do not include the communication processor, all signals and/or messages may be processed by the processor 950.

The memory 930 may store various pieces of data required for the control of the second UE 910 on the basis of the embodiments described in FIGS. 1 to 7 and may have an area for storing the above-described messages and data.

The processor 950 may control the basic operation of the second UE 120 and may control transmission/reception, processing, and storage of messages and data on the basis of the embodiments described in FIGS. 1 to 7.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary.

The invention claimed is:

1. A method performed by a second terminal in a wireless communication system, the method comprising:

establishing a unicast link with a first terminal;

receiving, from the first terminal, a link identifier (ID) update request message including a first new identifier of the first terminal, by using a first old identifier of the first terminal and a second old identifier of the second terminal;

in response to the link ID update request message, transmitting, to the first terminal, a link ID update response message including a second new identifier of the second terminal and the first new identifier, by using the first old identifier and the second old identifier, wherein, after the second terminal transmits the link ID update response message that includes the first new identifier and the second new identifier to the first terminal, a first data traffic that is based on the first old identifier and the second old identifier is continuously received by the second terminal from the first terminal, until the second terminal receives a second data traffic that is based on the first new identifier and the second new identifier from the first terminal;

determining that a link ID update acknowledgement message including the second new identifier is not received from the first terminal for a predetermined time after the link ID update response message is transmitted; and based on the determination, retransmitting, to the first terminal, the link ID update response message.

2. The method of claim 1, wherein a third data traffic that is based on the first old identifier and the second old identifier is continuously transmitted by the second terminal to the first terminal, until the second terminal receives the link ID update acknowledgement message from the first terminal.

3. The method of claim 1, further comprising:

transferring, to an access stratum (AS) layer of the second terminal from a higher layer of the second terminal, the first new identifier and the second new identifier;

updating, by the AS layer, the unicast link based on the first new identifier and the second new identifier transferred from the higher layer; and performing a unicast communication with the first terminal, based on the first new identifier and the second new identifier.

4. A second terminal in a wireless communication system, the second terminal comprising:

a transceiver; and a controller configured to:

establish a unicast link with a first terminal, receive, from the first terminal via the transceiver, a link identifier (ID) update request message including a first new identifier of the first terminal, by using a first old identifier of the first terminal and a second old identifier of the second terminal, in response to the link ID update request message, transmit, to the first terminal via the transceiver, a link ID update response message including a second new identifier of the second terminal and the first new identifier, by using the first old identifier and the second old identifier, wherein, after the second terminal transmits the link ID update response message that includes the first new identifier and the second new identifier to the first terminal, a first data traffic that is based on the first old identifier and the second old identifier is continuously received by the second terminal from the first terminal, until the second terminal receives a second data traffic that is based on the first new identifier and the second new identifier from the first terminal, determine that a link ID update acknowledgement message including the second new identifier is not received from the first terminal for a predetermined time after the link ID update response message is transmitted; and based on the determination, retransmit, to the first terminal via the transceiver, the link ID update response message.

5. The second terminal of claim 4, wherein a third data traffic that is based on the first old identifier and the second old identifier is continuously transmitted by the second terminal to the first terminal, until the second terminal receives the link ID update acknowledgement message from the first terminal.

6. The second terminal of claim 4, wherein the controller is further configured to:

transfer, to an access stratum (AS) layer of the second terminal from a higher layer of the second terminal, the first new identifier and the second new identifier, and update, by the AS layer, the unicast link based on the first new identifier and the second new identifier transferred from the higher layer.

7. The second terminal of claim 6, wherein the controller is further configured to perform a unicast communication with the first terminal, based on the first new identifier and the second new identifier.

* * * * *